(12) United States Patent
Oliphant et al.

(10) Patent No.: US 9,369,480 B2
(45) Date of Patent: *Jun. 14, 2016

(54) SYSTEMS AND METHODS FOR AUTOMATING BLIND DETECTION OF COMPUTATIONAL VULNERABILITIES

(71) Applicant: McAfee, Inc., Santa Clara, CA (US)

(72) Inventors: Brett Oliphant, American Canyon, CA (US); Ben Tyler, Mountain View, CA (US); Gabriel Pack, Napa, CA (US); Brett Hardin, American Canyon, CA (US)

(73) Assignee: McAfee, Inc., Santa Clara, CA (US)

(*) Notice: Subject to any disclaimer, the term of this patent is extended or adjusted under 35 U.S.C. 154(b) by 138 days.

This patent is subject to a terminal disclaimer.

(21) Appl. No.: 14/155,201

(22) Filed: Jan. 14, 2014

(65) Prior Publication Data

US 2014/0130172 A1 May 8, 2014
US 2014/0317749 A9 Oct. 23, 2014

Related U.S. Application Data

(63) Continuation of application No. 12/024,954, filed on Feb. 1, 2008, now Pat. No. 8,631,497.

(60) Provisional application No. 60/887,801, filed on Feb. 1, 2007.

(51) Int. Cl.
*G06F 12/14* (2006.01)
*H04L 29/06* (2006.01)
*G06F 21/55* (2013.01)
*G06F 21/57* (2013.01)

(52) U.S. Cl.
CPC .......... *H04L 63/1433* (2013.01); *G06F 21/556* (2013.01); *G06F 21/577* (2013.01); *G06F 2221/033* (2013.01); *H04L 63/168* (2013.01)

(58) Field of Classification Search
CPC ............ G06F 2221/033; G06F 21/577; H04L 63/1433
USPC ......................................................... 726/25
See application file for complete search history.

(56) References Cited

U.S. PATENT DOCUMENTS 6,378,126 B2  4/2002  Tang
6,681,331 B1  1/2004  Munson et al.
7,007,275 B1  2/2006  Hanson et al.
(Continued)

OTHER PUBLICATIONS

Meer et al.; It's all about the timing. . . ; 2007; Retrieved from the Internet <URL: dc414.org/download/confs/defcon15/Speakers/Meer_and_Slaviero/Whitepaper/dc-15-meer_and_slaviero-WP.pdf>; pp. 1-16 as printed.*

(Continued)

*Primary Examiner* — Aravind Moorthy
(74) *Attorney, Agent, or Firm* — Blank Rome LLP

(57) ABSTRACT

Methods for blind detection of computational vulnerabilities include the submission by a detecting system of potentially interpretable information to a target system; measurement of the timing characteristics of the output from the target system by the detecting system; and diagnosis of the vulnerabilities of the target system by the detecting system as based on the timing characteristics, optionally in conjunction with auxiliary data. Invented systems provide reference implementations of these methods.

20 Claims, 3 Drawing Sheets

(56) References Cited

U.S. PATENT DOCUMENTS

| | | | |
|---|---|---|---|
| 7,275,087 | B2 | 9/2007 | Vaschillo et al. |
| 8,631,497 | B1 * | 1/2014 | Oliphant ............... G06F 21/556 726/25 |
| 2002/0083169 | A1 | 6/2002 | Aki et al. |
| 2006/0021047 | A1 | 1/2006 | Cook |
| 2007/0192863 | A1 | 8/2007 | Kapoor et al. |
| 2008/0120722 | A1 | 5/2008 | Sima et al. |

OTHER PUBLICATIONS

Bortz, et. al, "Exposing Private Information by Timing Web Applications", May 8-12, 2007, Proceedings of the 16th international conference on World Wide Web, Retrieved from the Internet <URL: dl.acm.org/citation.cfm?id=1242656>, pp. 621-628 as printed.

Stender, "Blind Security Testing—An Evolutionary Approach", Jun. 29, 2007, Retrieved from the Internet <URL: isecpartners.com/media/11988/iSEC_Scott_Stender_Biind_Security_Testing.bh07.pdf>, pp. 1-8 as printed.

Halfond, et. al, "A Classification of SOL Injection Attacks and Countermeasures", IEEE 2006, Retrieved from the Internet <ULR: .cc.gatech.edu/fac/Aiex.Orso/papers/halfond.viegas.orso.ISSSE06.pdf>, pp. 1-11 as printed.

Larouche, Tutorial of SQL Power Injector 1.1, 2006, Retrieved from the Internet <URL: sqlpowerinjector.com/docs/TutorialSPInjv1.1.pdf>, pp. 1-44.

Klein, et. al, Blind XPath Injection, 2005, Retrieved from the Internet <URL: http://2stop.me/S%C3%A9curit%C3%A9%20Informatique/Web/EN%20-%20Blind%20Xpath%20injection.pdf>, pp. 1-13 as printed.

Muthuprasanna et. al. (M. Muthuprasanna, Ke Wei, Suraj Kothari, "Eliminating SQL Injection Attacks—A Transparent Defense Mechanism," wse, pp. 22-32, Eighth IEEE International Symposium on Web Site Evolution (WSE'06), 2006, ISBN: 0/7695-2696-9).

Rabson ("Validate email formats with regular expressions in Oracle 10g", Jonathan Rabson. Exploring Oracle; Louisville (1098-4755), Oct. 2004. vol. 9,Iss.10;p. 5).

Ettore et. al. ("Insider and Ousider Threat-Sensitive SQL Injection Vulnerability Analysis in PHP" Ettore Merlo; Dominic Letarte; Giuliano Antoniol. Reverse Engineering, 2006. WCRE '06. 13th Working Conference on (1095-1350) (0/7695-2719-1) 2006. p. 156-156).

Krishnakhanna, comment 13 of Thread: Preventing SQL Injection, 2007, Retrieved from the Internet <URL: .sitepoint.com/forums/showthread.php?497463-Preventing-SQL-Injection>, pp. 1-22 as printed.

Fried!, SQL Injection Attacks by Example, 2007, Retrieved from the Internet <URL: .unixwiz.net/techtips/sql-injection.html>, pp. 1-11 as printed.

Chapela, Advanced SQL Injection, 2005, Retrieved from the Internet <URL: .one-esecurity.com/docs/Victor.sub.--Chapela-Advanced.sub.--SQL.-sub.--Injection.pdf>, pp. 1-93 as printed.

Stamos, Attacking Web Services, 2006, Retrieved from the Internet <URL: cansecwest.com/slides06/csw06-stamos.pdf>, pp. 1-55 as printed.

Anley, (more) Advanced SQL Injection, 2002, NGSSoftware, Retrieved from the Internet <URL: web.archive.org/web/20060206232727/http://www.ngssoftware.com/papers/more-.sub.--advanced.sub.--sql.sub.--injection.pdf>, pp. 1-13 as printed.

* cited by examiner

SYSTEMS AND METHODS FOR AUTOMATING BLIND DETECTION OF COMPUTATIONAL VULNERABILITIES

CROSS-REFERENCE TO RELATED APPLICATIONS

The present application is a continuation of U.S. application Ser. No. 12/024,954, filed Feb. 1, 2008, entitled "SYSTEMS AND METHODS FOR AUTOMATING BLIND DETECTION OF COMPUTATIONAL VULNERABILITIES," which claims priority from U.S. Provisional Parent Application No. 60/887,801 filed Feb. 1, 2007, the contents of both of which are herein incorporated by reference in their entirety.

FIELD OF THE INVENTION

The present invention relates to the field of computer security and, more particularly, to the detection of vulnerabilities in systems accessible by a public or private network.

BACKGROUND OF THE INVENTION

The popularity of the Internet has given rise to e-commerce. As illustrated in FIG. 1, many consumers 102 enjoy the convenience of shopping at home via websites 104 such as Yahoo!, Amazon.com and eBay, as well as on-line banking via websites provided by banks such as Citibank. Many other activities that formerly required live interactions either in person or via phone can be conducted on-line, such as applying for car or health insurance, buying and selling stocks, etc. via the Internet 106.

Such on-line activities typically require the exchange and storage of personal information such as credit card numbers and banking information. Accordingly, consumers want to be able to trust that the websites 104 are secure from on-line vulnerabilities, such as the ability for hackers to gain access to their personal information.

The inventions and technologies described in co-pending U.S. patent application Ser. Nos. 10/113,875 and 10/674,878, the contents of which are incorporated herein by reference in their entirety, have dramatically advanced the slate of the art of vulnerability detection, assessment and management. For example, these co-pending applications describe techniques for performing vulnerability scans of websites, and hosting and controlling the contents of a mark in accordance with the scan results that indicates to visitors of the website how safe the website is. These vulnerability scans aim to duplicate and/or exploit methods known to be used by hackers to attempt to gain unauthorized access to the devices and systems of the website. Nevertheless, areas of potential improvement exist.

Websites such as 104 are accessed by client software programs over the Internet via a protocol known as Hypertext Transfer Protocol (or HTTP). Using an HTTP request, a client can ask for specific content from a website and/or send user data to the website. Per the specification of the request, the website generates content and returns the content to the client via a corresponding HTTP response. A web browser (e.g. Internet Explorer) is the most common example of an HTTP client. Web browsers make HTTP requests when users type in URLs or click on links or submit forms present in the content of the website. In the specific case of submitting a form, information keyed into the form by the user is included with the HTTP request. When generating content for a response, websites often dynamically construct code based on an HTTP request; and the code is executed by a corresponding interpreter. Dynamically constructed SQL statements executed by a relational database are the most common example, but any other language and interpreter including Ruby, PHP, PERL, etc. can serve.

An HTTP request has a defined structure with designated locations in the structure for carrying various types of information, including user data. By inspecting website content or observing HTTP traffic, a hacker can deduce specifically useful incarnations of the HTTP request structure that can be used to submit unauthorized and/or potentially harmful input to the website.

For example, SQL injection is used by hackers seeking to gain unauthorized access to a website's data servers by embedding executable SQL code into SQL statements that are dynamically constructed by the web application. Depending on the nature of the statements being constructed by the web application, various injection techniques are applicable. All of these techniques focus on breaking out of a SQL statement, inserting an augmentation of the broken statement or inserting an entirely new statement, and optionally breaking back into the remaining statements of a statement block. Effectively, this approach splices foreign SQL code into the target system's constructed SQL statements. If this splice is successful, a hacker can gain unauthorized access into a website's databases and other systems.

Conventional vulnerability scans attempt to inject SQL statements and analyze the resulting content of output from a target system. This content analysis can be used to discover database vendor type disclosures, information about an underlying relational schema, or actual data contained in a schema. Detecting evidence of a vulnerability through content inspection is generally conclusive. However, the failure to detect evidence of a vulnerability through content inspection is not conclusive. A target system may still, indeed, be vulnerable to SQL injection attacks even if the content of the output does not indicate this.

Accordingly, there remains a need in the art for a method and apparatus to effectively detect vulnerabilities such as SQL and other forms of interpreter injection.

SUMMARY OF THE INVENTION

The invention provides systems and methods for automated detection of injection vulnerabilities in web applications. According to an aspect of the invention, for programming languages that provide constructs for altering the time mechanics of program execution, the invention can detect the presence of interpreters for these languages and attempt to subvert said interpreters by constructing and submitting input designed to alter the time mechanics of the execution. In embodiments, the invention submits input intended to increase latency in generated output from the target system. A basis of comparison is established by submitting innocuous input that is intended to be a non-operation. Roughly, if the former input results in increased latency of output as compared to the innocuous input, the presence of the associated interpreter and its susceptibility to subversion are established. Injected input can include, for some target systems, potentially interpreted data. For other target systems, injected input can include altered requests such as HTTP requests.

Vulnerability detection methods according to the invention include the submission by a detecting system of potentially interpretable information to a target system; measurement of the timing characteristics of the output from the target system by the detecting system; and diagnosis of the vulnerabilities of the target system by the detecting system as based on the timing characteristics, optionally in conjunction with auxiliary data. Invented systems provide reference implementations of these methods.

The claimed systems of detection can be adapted for a variety of target systems. Adaptations include asynchronous systems, synchronous systems, networked systems, web applications, and systems that employ any of a variety of SQL interpreters.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF PREFERRED EMBODIMENTS

Figure 1:
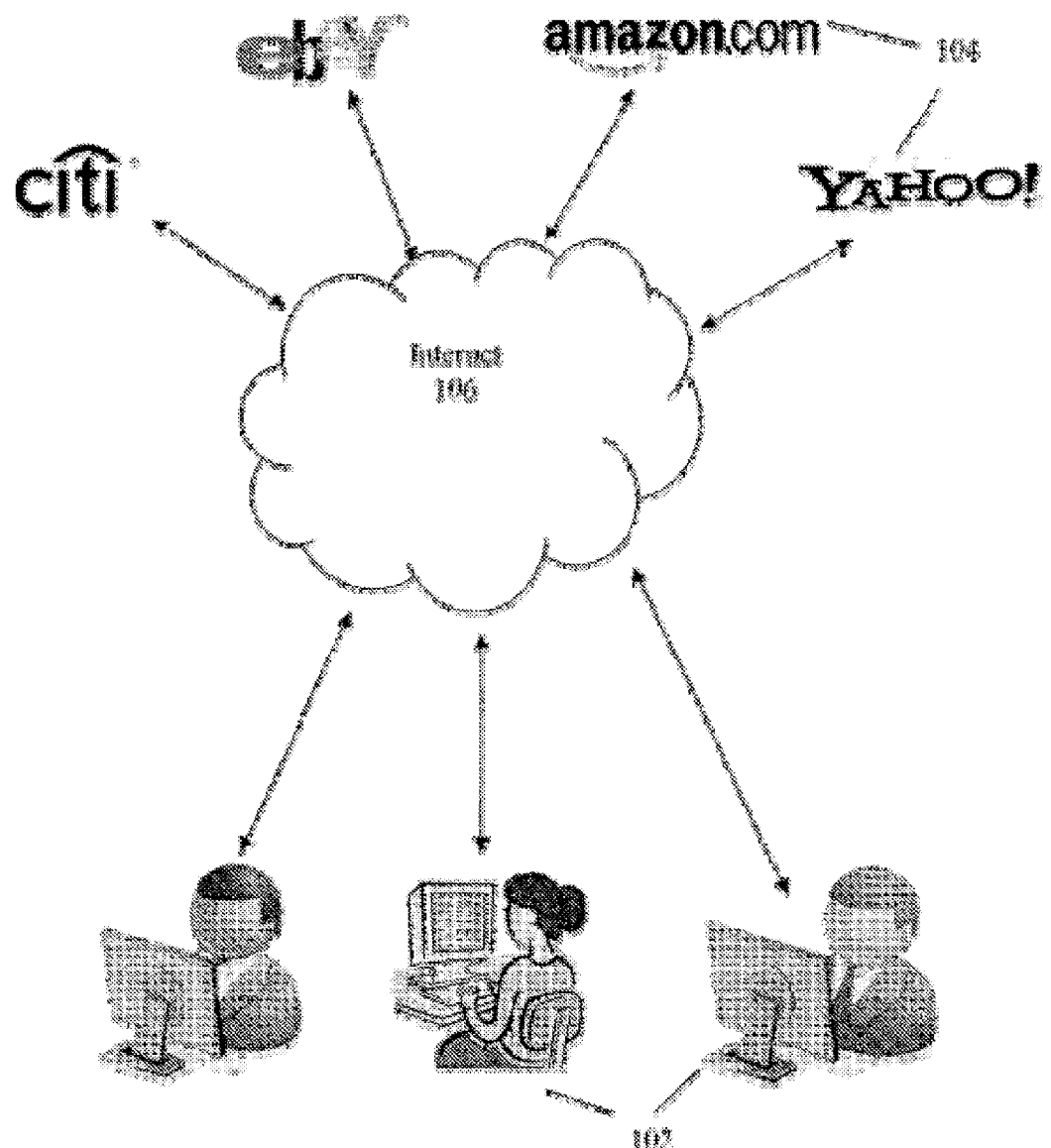
FIG. 1 illustrates how users interact with conventional websites.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the invention relates to using the timing characteristics of target system output to determine the presence of vulnerabilities, referred to herein as blind detection. It is referred to as "blind" to distinguish the technique from the conventional content analysis methods, which attempt to inject code and analyze the response output of a target system to determine whether the system is vulnerable. Timing information is valuable when the potentially interpretable input to the target system is designed to alter the timing mechanics of the target system's execution.

Accordingly, for programming languages that provide constructs for altering the time mechanics of program execution, the invention can detect the presence of interpreters for these languages in the target system and further attempt to subvert these interpreters by constructing and submitting input designed to alter the time mechanics of the execution. In embodiments, the invention submits input intended to increase latency in generated output from the target system. A basis of comparison is established by submitting innocuous input that is intended to be a non-operation. Roughly, if the former input results in increased latency of output as compared to the innocuous input, the presence of the associated interpreter and its susceptibility to subversion are established. A large number of programming languages provide an ability to alter time mechanics, and can be tested in accordance with aspects of the invention. Examples include custom SQL language extensions, PHP, Ruby, PERL, Python, Java, C, C++, etc. Generally, in addition to the foregoing, any language that supports looping can be tested, as can anything that has a wait, sleep, etc. call.

Figure 2:
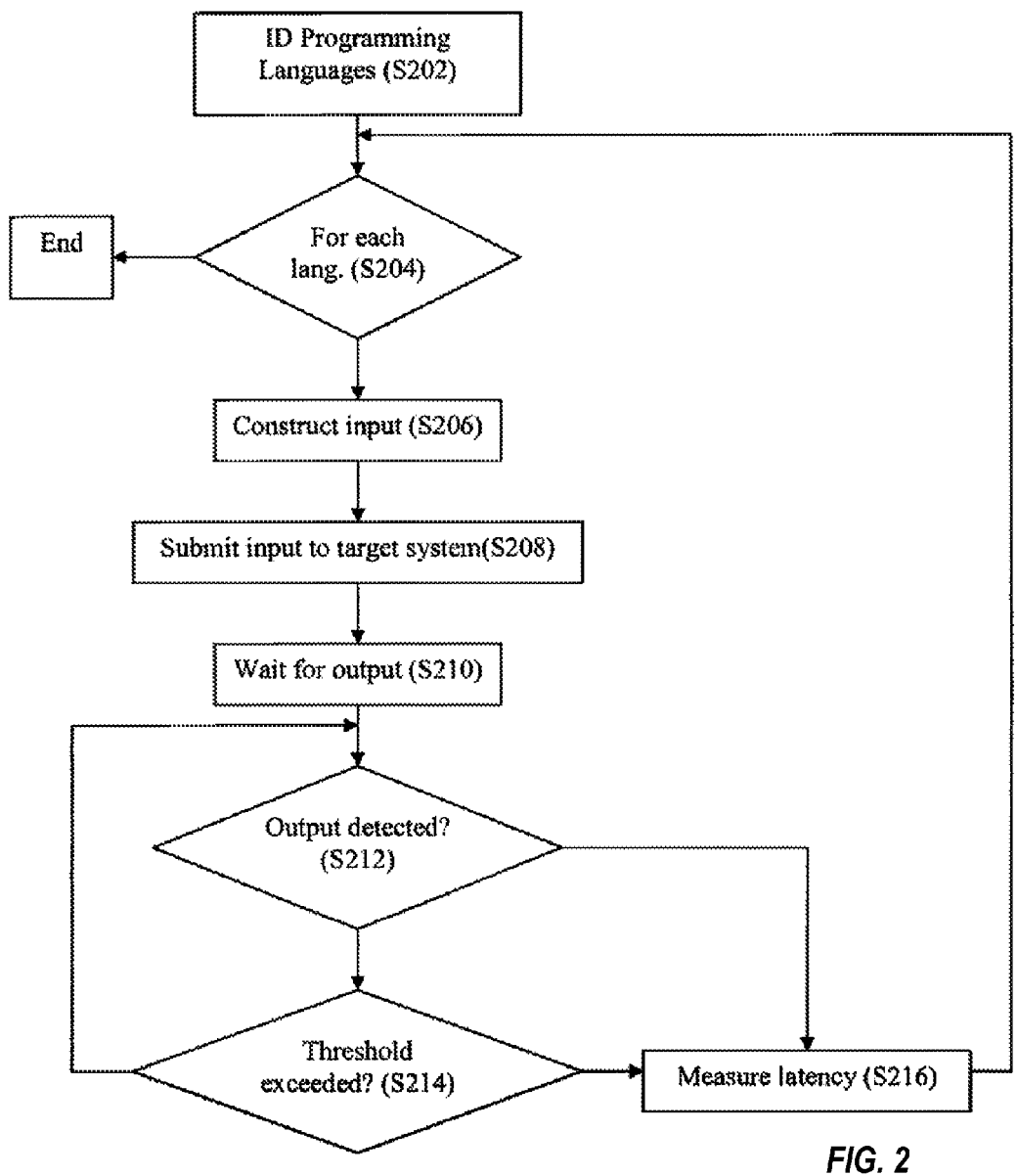
FIG. 2 is a flowchart illustrating an example injection vulnerability detection method of the invention.

An example methodology according to aspects of the invention is illustrated in FIG. 2.

As shown in FIG. 2, in a first step S202, either through configuration or by inherent ability in the detection system, each programming language of interest is determined. For example, the set of programming languages is configured in advance. Additionally or alternatively, where the target system is a web site (e.g. www.example.com), the web site can be "deep crawled," and the set of programming languages can be determined dynamically in accordance with this or other determinations.

For each language of interest, as determined in step S204, input that is theoretically capable of prolonging execution time for an interpreter of the language is constructed in step S206. In one non-limiting example that is provided for illustration and will be embellished more fully below, the detection system could request a URL from the system's HTTP server in the form of www.example.com/<interpreter call> <arguments>, where <interpreter call> is a call to a program in the programming language of interest and <arguments> contains arguments for the program. The exact contents of the strings <interpreter call> and <arguments> depend on the forms and interactive elements identified in step S202, combined with injected content designed to prolong the execution time of the associated interpreter.

In step S208, the constructed input is submitted to the target system, and the point in time at which the input is submitted is recorded. Up to a configurable time threshold, the detecting system waits for output from the target system in step S210. For example, the input is submitted as an HTTP request, and the output is considered to be any HTTP response associated with that request. When the TCP/IP protocol is used as the underlying protocol, the waiting time includes the time spent attempting to read the corresponding HTTP response from the underlying TCP/IP client socket on which the associated HTTP request was issued.

Once output is detected (determined in step S212) or the time threshold is reached (determined in step S214), the corresponding point in time is recorded. The difference between the latter point in time and the time of submission can be used to measure the latency in the generation of output for the corresponding input (step S216). If the measured latency is above a given threshold, the target system is determined to be vulnerable to the corresponding injection method.

In embodiments, detecting an output for a given input is repeated a plurality of times and the average of the latencies measured for that input is determined to be representative.

Moreover, according to certain aspects of the invention, there are inherent difficulties in determining the vulnerability of a target system based on output timing characteristics. Timing can be impacted by a wide variety of transient factors and nominal latencies that reflect loads and bottlenecks for each target system component employed in the generation of output (i.e. CPUs, storage, communication buses, networks, etc.). While a human penetration tester can ascertain more obvious instances of blind vulnerability detection, the invention uses statistical techniques to rapidly and accurately establish the presence of vulnerabilities in a far wider range of cases. For example, Chebychev's inequality can be used to determine the representative value, ensuring a statistically defensible sample size is used.

Still further, baseline latency can be established using the same statistical technique applied to innocuous input for the interpreter of interest. The innocuous input can be designed to be analogous to the input for blind detection but without artificially prolonging the execution time of the interpreter. If the blind latency is higher than the baseline latency by an appreciable amount, the detection system records that the target system has a vulnerable interpreter for the programming language of interest. What constitutes an appreciable amount depends upon the nature of programming language technique being actuated by the input, as will be appreciated by those skilled in the art.

A measurement of latency for synchronous systems is established as the difference between the point in time that output is returned from and the point in time that input is submitted to a synchronous call to the target system. A measurement of latency for asynchronous systems is established as the difference between the point in time that a message is received via a callback registered with the target system by the detection system and the point in time that a corresponding message with the input to be interpreted is sent to the target system.

It should be noted that adaptations of synchronous and asynchronous detection techniques can extend to networked target systems. Protocols such as HTTP over TCP/IP and SONET are amenable to synchronous detection while asynchronous protocols like ATM are approached with asynchronous techniques. It should be noted that the distinction between synchronous and asynchronous techniques is not only applicable to network protocols. The distinction is just as applicable to target systems that don't use a network protocol. For instance, the target system could be a software library loaded by the detection system. The invention is applicable to synchronous, asynchronous, or both kinds of entry points where input could be submitted.

Figure 3:
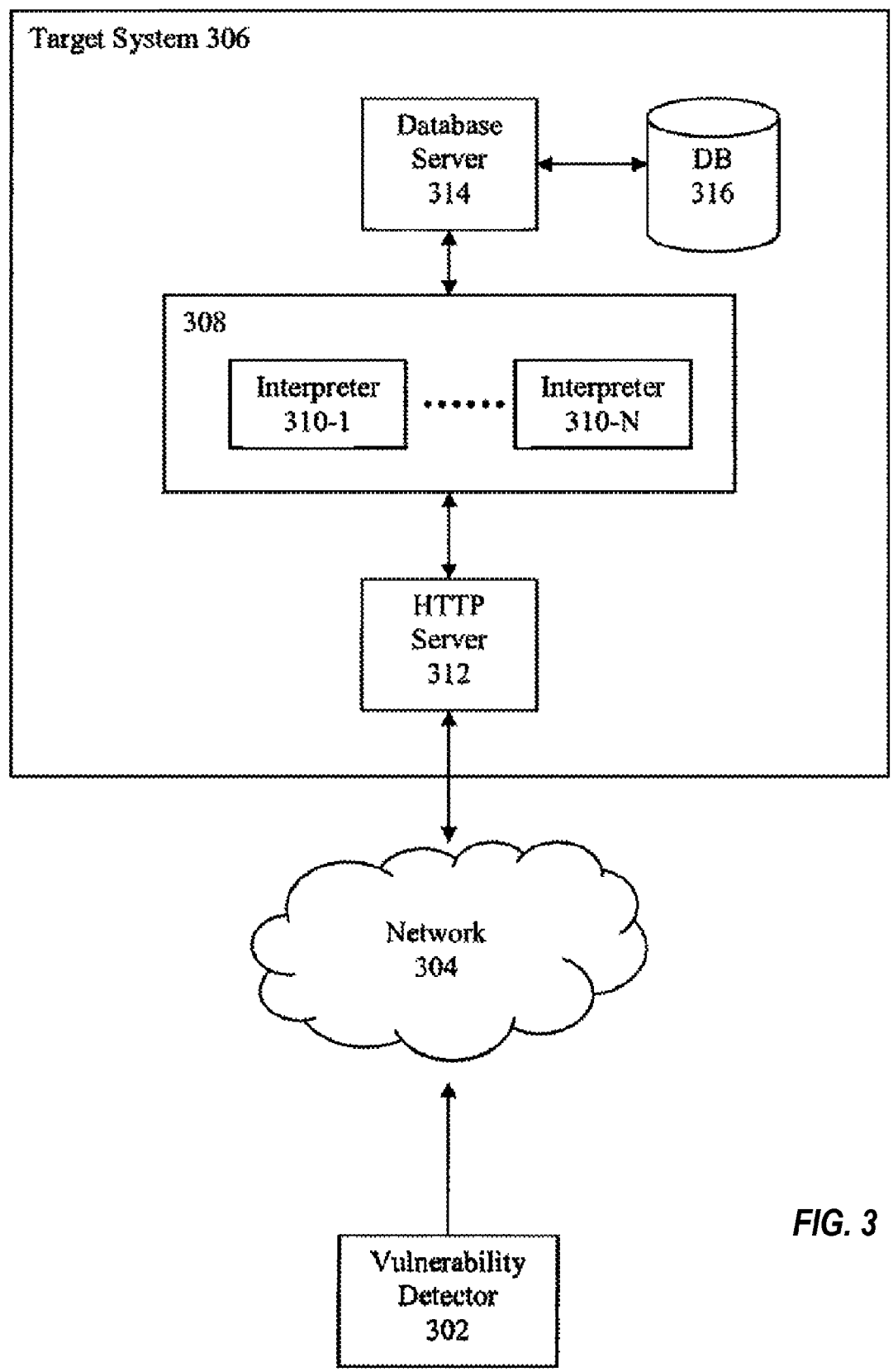
FIG. 3 is a block diagram illustrating an example system that implements aspects of injection vulnerability detection according to the invention.

An example system for performing automated blind vulnerability detection for a networked target system according to aspects of the invention is shown in FIG. 3. As shown in FIG. 3, a detection method such as that described above in connection with FIG. 2 can be conducted by attaching a detection system 302 to a network 304 in common with a target system 306. In embodiments, detection system 302 can be part of a network of distributed scanning servers, for example, located in data centers that are geographically dispersed around the world. In embodiments, detection system 302 can include a local scan appliance that is controlled by a central vulnerability management system, so that the most suitable scan appliance is assigned to test the target system.

Detection system 302 uses applicable network communication protocols to interact with computational services presented by the target system 306 via the network 304. Synchronous and asynchronous measurements of latency are employed depending on the protocols used to interact with the target system's computational services. For synchronous protocols that support customizable read timeout thresholds such as HTTP over TCP/IP, the thresholds are elevated to accommodate the expected increase in latency while waiting for a response.

Networked target system 306 provides one or more web applications 308 accessible over the Internet or other network via the HTTP protocol and one or more HTTP servers 312. Using web application scanning techniques described in the co-pending applications, and/or those known to those skilled in the art, including techniques developed by ScanAlert of Napa, Calif., supported interpreters 310 and input controls for the web applications can be readily identified by parsing the structured content of responses. Beyond legitimate input controls, other means of submitting input can be identified such as HTTP request headers.

In embodiments, detection system 302 uses these scanning techniques to identify the supported interpreters 310, as well as attack vectors that are used to deliver the input payloads for blind vulnerability detection, using methods such as that described in connection with FIG. 2 above for example. Commonly layered over TCP/IP, the read timeout for the detection system 302's TCP/IP client connection with target system 306 is elevated to accommodate the expected increase in latency.

According to aspects of the invention shown in FIG. 3, the injection methods and systems described above find particularly useful application in target systems 306 having a SQL interpreter 310, which can further form queries for execution by a database server 314 that communicates with one or more databases 316. In embodiments, therefore, detection system 302 is configured for performing vulnerability detection through SQL injection. As mentioned above, SQL injection seeks to embed executable SQL code into SQL statements that are dynamically constructed by the target system. In contrast to the techniques of the prior art as also mentioned above, the invention contemplates blind SQL injection, where the input to the target system is designed to prolong the execution of the SQL interpreter.

An example implementation of the invention will now be described in more detail in connection with target systems having SQL interpreters using Transact SQL or TSQL, available from Microsoft Corp. of Redmond, Wash. One of the features of TSQL is support for the WAITFOR statement. The WAITFOR statement can be used to suspend the execution of SQLServer according to a variety of criteria. Of particular interest is the form of the statement that suspends execution for a specified duration of time.

Accordingly, when the detection system 302 includes support for TSQL, it forms blind SQL injection inputs that make use of the WAITFOR statement. An example set of blind SQL injection inputs is set forth in TABLE 1 below.

In one example implementation, each input in TABLE 1 is used until the set is exhausted or one input results in detection. Injection points correspond to the structure of a legitimate HTTP request, including locations in the structure that carry user-supplied data as well as locations that support protocol-specific aspects of HTTP. For example, the system might detect an HTML form in the content of the target system (e.g. www.example.com) that, on submission from a typical web browser, would be sent as follows:

POST/buy/cog.jsp?product=a&account=55 HTTP/1.1
Host: www.example.com
Cookie: SESSION=123
Content-Type: application/x-www-form-urlencoded
quantity=3&color=red In HTTP parlance, the first line is a request line. The next three lines are headers. Then there's a blank line followed by a content body. Embodiments of the invention replace the following strings (i.e. injection points) from the lines above with a given input <string> from TABLE 1, one at a time, producing a sequence of injected HTTP requests: buy, cog.jsp, cog, jsp, product, a, account, 55, Host, www.example.com, www, example, com, Cookie, SESSION=123, SESSION, 123, Content-Type, Content, Type, application/x-www-form-urlencoded, application, x, www, form, urlencoded, quantity, 3, color, and red.

Accordingly, for N injection points and M inputs, there are N×M possible requests. In one example implementation, the detection system of the invention would stop sending requests either when the number of possible requests is exhausted or when there is a successful detection.

to determine how quickly their MySQL installations can execute arbitrary SQL statements. The BENCHMARK command can be instructed to repeatedly execute the supplied SQL statements an arbitrary number of times. The present inventors recognize that by greatly elevating the number of times execution should be repeated, significant delays can be introduced to the BENCHMARK command.

Blind SQL injection inputs that make use of the BENCHMARK command are constructed for specific injection cases as follows.

TABLE 1

| Input description | Injection input string <string> |
|---|---|
| type agnostic break, no comment, keyword evasion via hex | - 1 declare @x varchar(99) set @x=0x77616974666f722064656c61792027303a303a323027 exec(@x)--' waitfor delay '0:0:40 |
| type agnostic break, comment, keyword evasion via hex | - 1 declare @x varchar(99) set @x=0x77616974666f722064656c61792027303a303a323027 exec(@x)--' waitfor delay '0:0:40'-- |
| type agnostic break, terminate with numeric, comment, keyword evasion via hex | - 1;declare @x varchar(99) set @x=0x77616974666f722064656c61792027303a303a323027 exec(@x)--' waitfor delay '0:0:40'-- |
| type agnostic break, terminate with string, comment, keyword evasion via hex | - 1 declare @x varchar(99) set @x=0x77616974666f722064656c61792027303a303a323027 exec(@x)--'; waitfor delay '0:0:40'-- |
| numeric break, no comment, keyword evasion via hex | - 1 declare @x varchar(99) set @x=0x77616974666f722064656c61792027303a303a323027 exec(@x) |
| numeric break, comment, keyword evasion via hex | - 1 declare @x varchar(99) set @x=0x77616974666f722064656c61792027303a303a323027 exec(@x)-- |
| numeric break, terminate with numeric, comment, keyword evasion via hex | - 1;declare @x varchar(99) set @x=0x77616974666f722064656c61792027303a303a323027 exec(@x)-- |
| string break, terminate with string, comment, keyword evasion via hex | - 1';declare @x varchar(99) set @x=0x77616974666f722064656c61792027303a303a323027 exec(@x)-- |
| numeric break, terminate, comment, keyword evasion via hex | - ;declare @x varchar(99) set @x=0x77616974666f722064656c61792027303a303a323027 exec(@x)-- |
| string break, no comment | - x' waitfor delay '0:0:40 |
| string break, comment | - x' waitfor delay '0:0:40'-- |
| terminate with string, comment | - x';waitfor delay '0:0:40'-- |
| terminate, comment | ';waitfor delay '0:0:40'-- |
| email break, no comment | - xxxx@xxxx.com' waitfor delay '0:0:40 (where xxxx@xxxx.com is a valid email address provided by the detection system 302) |
| email break, comment | - xxxx@xxxx.com' waitfor delay '0:0:40'-- |
| terminate with email, comment | - xxxx@xxxx.com';waitfor delay '0:0:40'-- |
| numeric break, no comment | - 1 waitfor delay '0:0:20' |
| numeric break, comment | 1 waitfor delay '0:0:20' |
| terminate with numeric, comment | - I ;waitfor delay '0:0:20'N- |
| terminate, comment | - ;waitfor delay '0:0:20'-- |
| string break, keyword evasion via null | - x' waitfor %00delay '0:0:20 |
| string break, keyword evasion via control | - x' waitfor %00%01%03delay '0:0:20 |
| numeric break, keyword evasion via null | - 1 waitfor %00delay '0:0:20' |
| numeric break, keyword evasion via control | - 1 waitfor %00%01%03delay '0:0:20' |

In the above examples, delays of 20 and 40 seconds and corresponding hexadecimal encodings are used. However, the invention is not limited to these examples, and other delay times can be used by the detection system.

An example implementation of the invention will now be described in more detail in connection with target systems having SQL interpreters using MySQL. MySQL provides a BENCHMARK command to allow database administrators Accordingly, when the detection system 302 includes support for MySQL, it forms blind SQL injection inputs that make use of the BENCHMARK command. An example set of blind SQL injection inputs is set forth in TABLE 2 below. The string <string> in the following table is typically injected by detection system 302 in a manner as described above.

TABLE 2

| Input description | Injection input string <string> |
|---|---|
| post WHERE clause, OR operator, numeric break, no comment | - 1 or 1=(select if (substring(1,1,1)=1,BENCHMARK(6000000,MD5(CHAR(1))),null)) |
| post WHERE clause, OR operator, numeric break, comment | - 1 or 1=(select if (substring(1,1,1)=1,BENCHMARK(6000000,MD5(CHAR(1))),null))-- |
| post WHERE clause, OR operator, numeric break, comment | - 1 or 1=(select if (substring(1,1,1)=1,BENCHMARK(6000000,MD5(CHAR(1))),null))/* |
| post WHERE clause, AND operator, numeric break, no comment | - 1 and 1=(select if (substring(1,1,1)=1,BENCHMARK(6000000,MD5(CHAR(1))),null)) |
| post WHERE clause, AND operator, numeric break, comment | - 1 and 1=(select if (substring(1,1,1)=1,BENCHMARK(6000000,MD5(CHAR(1))),null))-- |
| post WHERE clause, AND operator, numeric break, comment | - 1 and 1=(select if (substring(1,1,1)=1,BENCHMARK(6000000,MD5(CHAR(1))),null))/* |
| post WHERE clause, OR operator, string break, no comment | - x' or 1=(select if (substring(1,1,1)=1,BENCHMARK(6000000,MD5(CHAR(1))),null)) |
| post WHERE clause OR operator, string break, comment | - x' or 1=(select if (substring(1,1,1)=1,BENCHMARK(6000000,MD5(CHAR(1))),null))-- |
| post WHERE clause OR operator, string break, comment | - x' or 1=(select if (substring(1,1,1)=1,BENCHMARK(6000000,MD5(CHAR(1))),null))/* |
| post WHERE clause, AND operator, string break, no comment | - x' and 1=(select if (substring(1,1,1)=1,BENCHMARK(6000000,MD5(CHAR(1))),null)) |
| post WHERE clause, AND operator, string break, comment | - x' and 1=(select if (substring(1,1,1)=1,BENCHMARK(6000000,MD5(CHAR(1))),null))-- |
| post WHERE clause, AND operator, string break, comment | - x' and 1=(select if (substring(1,1,1)=1,BENCHMARK(6000000,MD5(CHAR(1))),null))/* |
| pre WHERE clause, no comment | - BENCHMARK(6000000,ENCODE('1','1')) |
| pre WHERE clause, no comment | (select if (substring(1,1,1)=1,BENCHMARK(6000000,MD5(CHAR(1))),null)) |
| pre WHERE clause, comment | BENCHMARK(6000000,ENCODE('1','1'))-- |
| pre WHERE clause, comment | BENCHMARK(6000000,ENCODE('1','1'))/* |

In the examples provided above, the detection system attempts to repeat execution of the BENCHMARK command for 6000000 iterations. However, this is an example that does not limit the invention, and the number of iterations used by detection system is arbitrary and can be changed by configuration.

Although the blind injection principles of the invention can be practiced separately for any particular one or more types of interpreters, certain advantages are provided by combining the methods described for blind detection of vulnerabilities in web applications and blind detection of vulnerabilities for SQL interpreters. For example, such a detection system is capable of blind vulnerability detection of a target system that enjoys immense popularity in the role of facilitating online commerce—the database driven web application. Blind detection of vulnerabilities for this class of target system is particularly worthwhile given that many store sensitive customer information. Resolution of detected vulnerabilities can further reduce the likelihood of identity theft, denial of service attacks, and other exploits made possible by the improper validation of HTTP requests that contain data used in the dynamic construction of SQL statements.

The blind vulnerability detection techniques of the invention find a natural home in detection systems 302 that perform a more comprehensive set of vulnerability detection methods against target systems. Accordingly, the present inventors recognize that due to the increased latency that is inherent in the blind method, the detection system is preferably constructed so that execution of a blind method can be performed concurrently with other methods of detection. The use of concurrency greatly shortens the length of time necessary to complete the execution of all vulnerability detection methods in the repertoire of the detection system. Moreover, to avoid undesirable delays in the detection of other vulnerabilities, blind SQL injection and such other vulnerability detection methods are preferably executed in a multithreaded fashion, allowing for a better level of concurrency to mitigate any delays inherent in a specific detection method.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

We claim:

1. A non-transitory computer-readable medium having instructions stored thereon comprising instructions that when executed cause a programmable device to:
submit to a target computer system a plurality of times an innocuous input designed for execution by an interpreter potentially in use on the target system;
calculate a first latency for the target system as an average of latencies for the innocuous input;
submit a non-innocuous input designed for execution by the interpreter to the target system, the non-innocuous input analogous to the innocuous input and designed to increase latency of the target system;
calculate a second latency for the target system corresponding to the non-innocuous input; and
determine that the target system has the interpreter and that the interpreter is vulnerable responsive to the second latency exceeding the first latency by an amount corresponding to the non-innocuous input.

2. The computer-readable medium of claim 1, wherein the target system is an asynchronous system.

3. The computer-readable medium of claim 1, wherein the target system is a synchronous system.

4. The computer-readable medium of claim 1, wherein non-innocuous input is designed for execution by an SQL interpreter for a web application.

5. The computer-readable medium of claim 4, wherein the non-innocuous input is configured to cause the SQL interpreter to break out of a numeric data type.

6. The computer-readable medium of claim 4, wherein the non-innocuous input is configured to cause the SQL interpreter to break out of a string data type.

7. The computer-readable medium of claim 4, wherein the non-innocuous input alters an end of a statement block.

8. The computer-readable medium of claim 4, wherein the non-innocuous input alters a middle of a statement block and comments out a remainder of the block.

9. The computer-readable medium of claim 4, wherein the non-innocuous input is configured to cause the SQL interpreter to break out of a statement.

10. A system configured to detect a vulnerability of a target system, comprising:
a memory; and
one or more processors, communicatively coupled to the memory, wherein the memory stores instructions that when executed cause the one or more processors to:
generate an innocuous input designed for execution by an interpreter;
generate a non-innocuous input designed for execution by the interpreter;
calculate a first latency for the target system using the innocuous input;
calculate a second latency for the target system using the non-innocuous input; and
determine that the target system has the interpreter and that the interpreter is vulnerable responsive to the second latency exceeding the first latency.

11. The system of claim 10, wherein the instructions that when executed cause the one or more processors to calculate a first latency comprise instructions that when executed cause the one or more processors to:
submit the innocuous input to the target system a plurality of times; and
calculate the first latency as an average of latencies for the innocuous input.

12. The system of claim 10, wherein the non-innocuous input is designed to increase latency of the target system.

13. The system of claim 10, wherein the interpreter is an interpreter potentially in use on the target system.

14. The system of claim 10, wherein the non-innocuous input is analogous to the innocuous input.

15. A method of detecting a vulnerability of a target system, comprising:
calculating a first latency for a target computer system corresponding to an innocuous input submitted to the target computer system designed for execution by an interpreter potentially in use on the target system;
calculating a second latency for the target computer system corresponding to a non-innocuous input designed for execution by the interpreter to the target system; and
determine that the target computer system has the interpreter and that the interpreter is vulnerable responsive to the second latency exceeding the first latency.

16. The method of claim 15, wherein the interpreter is an SQL interpreter.

17. The method of claim 15, wherein calculating the first latency comprises:
submitting the innocuous input to the target computer system a plurality of times; and
calculating the first latency for the target computer system as an average of latencies for the innocuous input.

18. The method of claim 15, wherein the non-innocuous input is designed to increase latency of the target computer system.

19. The method of claim 15, wherein the non-innocuous input is analogous to the innocuous input.

20. The method of claim 15, wherein the target computer system is an asynchronous system.

* * * * *